United States Patent Office.

WILLIAM DAVIS, OF PORTLAND, MAINE.

Letters Patent No. 65,475, dated June 4, 1867.

IMPROVED BEVERAGE.

*The Schedule referred to in these Letters Patent and making part of the same.*

TO ALL WHOM IT MAY CONCERN:

Be it known that I, WILLIAM DAVIS, of Portland, in the county of Cumberland, and State of Maine, have invented and discovered a new and useful Ginger Ale; and I hereby declare the following to be a full, clear, and exact description thereof, which will enable others to make, compound, and use the same.

The object of my invention is the production of a healthful, agreeable, and cooling beverage, intended more particularly for use in the summer and warm seasons of the year. It is composed of various ingredients, upon the compounding of which and their proportions, hereafter given, the quality of the mixture is dependent.

I will now proceed to name the said ingredients. They are as follows: water, sugar, essence of lemon, citric acid solution, tincture of ginger, carbonate of magnesia. The proportions in which the above-named ingredients are compounded are as follows: For the manufacture of one gallon I take one gallon of water, into which I introduce seven pounds of sugar, six and one-half ounces of essence of lemon, one ounce of citric acid solution, one ounce of tincture of ginger, two ounces of carbonate of magnesia. The mixtures or ingredients are placed together and well filtered, when the compound is ready for putting up in bottles. Being placed in the bottles, the bottle is then charged with carbonic gas, after about two ounces of simple sirup have been added to each bottle of the capacity of a half pint. Immediately cork, and the ale is prepared for exportation and consumption. It is important that the bottle is tightly corked. When opened the ale has an effervescent quality, and may, if desired, be mixed with any kinds of wines or liquors.

What I claim as my invention, and desire to secure by Letters Patent, is—

The compound of ingredients herein specified for a beverage, as set forth.

W. DAVIS.

Witnesses:
W. H. CLIFFORD,
WM. FRANK SEAVEY.